US010241759B2

(12) United States Patent
Sass et al.

(10) Patent No.: US 10,241,759 B2
(45) Date of Patent: Mar. 26, 2019

(54) DETECTING OPEN SOURCE COMPONENTS BUILT INTO MOBILE APPLICATIONS

(71) Applicant: WHITESOURCE LTD., Bnei-Brak (IL)

(72) Inventors: Rami Sass, Tel-Aviv (IL); Tom Shapira, Zofit (IL)

(73) Assignee: WHITESOURCE LTD., Bnei-Brak (IL)

(*) Notice: Subject to any disclaimer, the term of this patent is extended or adjusted under 35 U.S.C. 154(b) by 0 days.

(21) Appl. No.: 15/436,821

(22) Filed: Feb. 19, 2017

(65) Prior Publication Data
US 2017/0249143 A1    Aug. 31, 2017

Related U.S. Application Data

(60) Provisional application No. 62/300,855, filed on Feb. 28, 2016.

(51) Int. Cl.
*G06F 9/44* (2018.01)
*G06F 8/36* (2018.01)

(52) U.S. Cl.
CPC ..................... *G06F 8/36* (2013.01)

(58) Field of Classification Search
None
See application file for complete search history.

(56) References Cited

U.S. PATENT DOCUMENTS

| 6,493,868 | B1* | 12/2002 | DaSilva | G06F 8/20 345/1.3 |
| 8,181,167 | B2* | 5/2012 | Zhao | G06F 8/427 717/143 |
| 8,843,882 | B1* | 9/2014 | Dejban | G06F 8/77 707/638 |
| 9,311,481 | B1* | 4/2016 | Wawda | H04L 63/145 |
| 9,349,002 | B1* | 5/2016 | Zhang | G06F 21/56 |
| 2004/0139176 | A1* | 7/2004 | Farrell | G06Q 10/06 709/220 |
| 2005/0216898 | A1* | 9/2005 | Powell, Jr. | G06F 8/36 717/141 |
| 2008/0228841 | A1* | 9/2008 | Mizuno | G06F 11/2097 |
| 2010/0242028 | A1* | 9/2010 | Weigert | G06F 21/105 717/131 |
| 2012/0240096 | A1* | 9/2012 | Sass | G06F 8/75 717/101 |
| 2012/0304152 | A1* | 11/2012 | Baldwin | G06F 8/70 717/120 |
| 2014/0173574 | A1* | 6/2014 | Schmidt | G06F 8/427 717/143 |
| 2015/0100940 | A1* | 4/2015 | Mockus | G06F 8/70 717/101 |

(Continued)

*Primary Examiner* — Insun Kang
(74) *Attorney, Agent, or Firm* — The Roy Gross Law Firm, LLC; Roy Gross

(57) ABSTRACT

A method, system and computer program product, the method comprising: obtaining an open source class and archive database; receiving an Android Application Package (APK); retrieving one or more class comprised in the APK; matching each of the classes against the open source class and archive database, to obtain a corresponding archive collection, such that each archive in the archive collection comprises at least one of the classes; and reporting the respective archive collection.

3 Claims, 4 Drawing Sheets

(56) References Cited

U.S. PATENT DOCUMENTS

| | | | |
|---|---|---|---|
| 2015/0143328 A1* | 5/2015 | Cope | G06Q 10/063 717/102 |
| 2016/0124757 A1* | 5/2016 | Nadarthur Sreenivasan | G06F 9/44521 717/172 |
| 2016/0132327 A1* | 5/2016 | Tehrani | G06F 8/74 717/105 |
| 2016/0253397 A1* | 9/2016 | Fryc | G06F 17/30575 707/624 |
| 2016/0267270 A1* | 9/2016 | Lee | H04L 63/145 |
| 2017/0102929 A1* | 4/2017 | Lee | G06F 8/65 |

\* cited by examiner

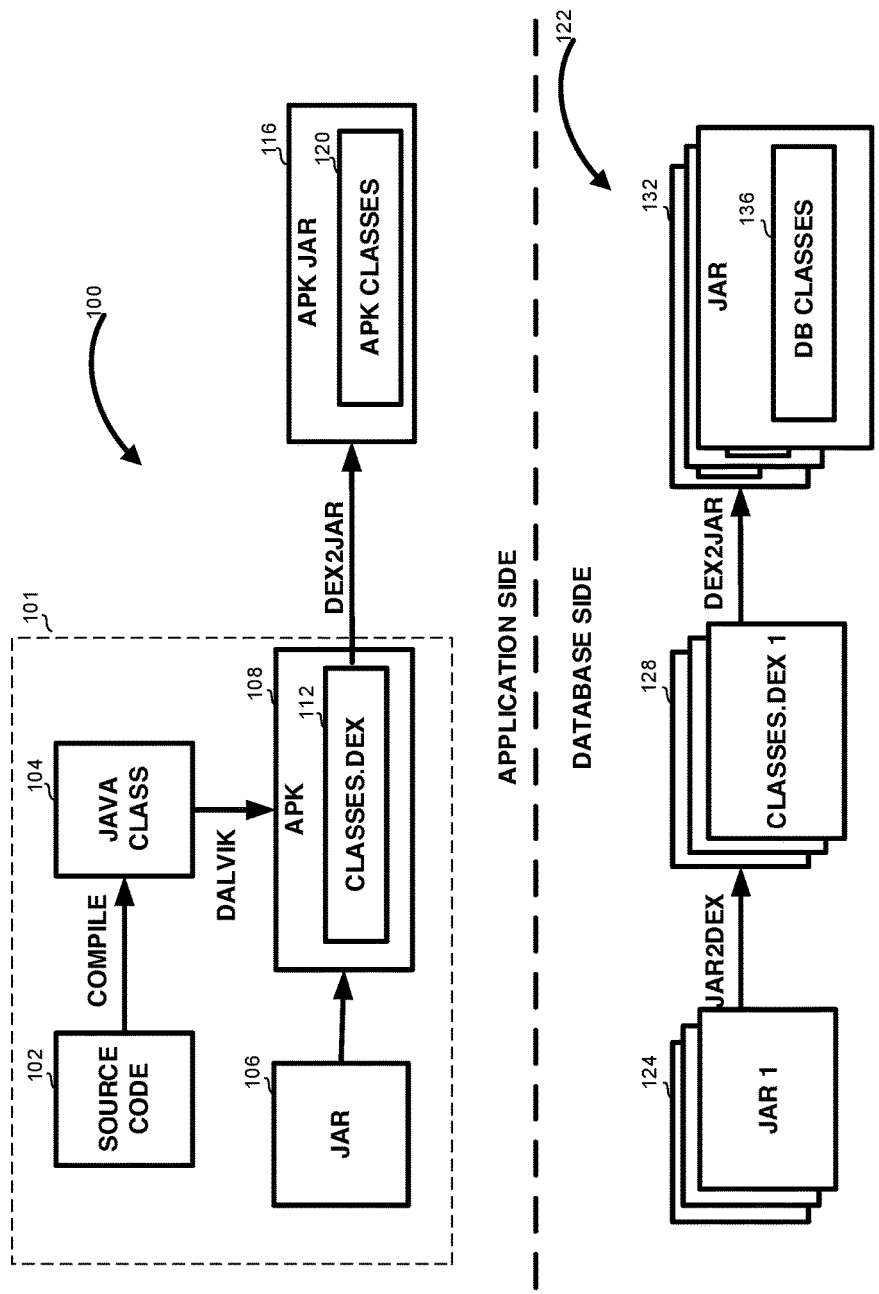

DETECTING OPEN SOURCE COMPONENTS BUILT INTO MOBILE APPLICATIONS

CROSS REFERENCE TO RELATED APPLICATIONS

This application claims priority from U.S. Provisional patent application No. 62/300,855, filed Feb. 28, 2016, entitled "A SYSTEM AND METHOD FOR CHECKING OPEN SOURCE USAGE", which is incorporated herein by reference in in entirety.

TECHNICAL FIELD

The present disclosure relates to open source in general, and to a system and apparatus for checking whether open source is used in an ANDROID Package Kit (APK), in particular.

BACKGROUND

Open source relates to computer source code that is publicly available and may be freely accessed and used by programmers in developing code. Open source may be provided as binary files or libraries to be linked with a user's' project, as code files to be compiled with a user's project, as code snippets to be added and optionally edited by a user as part of a file, as any other format, or in any combination thereof.

Open source may be used for a multiplicity of reasons, such as but not limited to: saving programming and debugging time and effort by obtaining a functional verified unit; porting or programming code to an environment in which the user has insufficient experience or knowledge; adding generic options such as graphic support, printing, or the like, or other purposes. The ease of obtaining such code on the Internet has greatly increased the popularity of its usage.

Despite the many advantages, source code may also carry hazards. One such danger may relate to the need to trust code received from an external source. Such code may contain bugs, security hazards or vulnerabilities, time or space inefficiencies, or even viruses, Trojan horses, or the like.

Another problem in using open source relates to the licenses which may be associated with any open source unit. Any such license may incur specific limitations or requirements on a user or a user's project developed using the open source.

Some licenses may require copyright and notification of the license. Others may require that if a user modified the used open source, for example fixed a bug, the user shares the modified version with other users in the same manner as the original source code was shared. Further licenses may require sharing the users' code developed with the open source with other users. The extent for which sharing is required may vary between files linked with files containing open source, and the whole user project. Further requirements may even have implications on the user's clients which may use the project developed with open source.

Open source may also pose legal limitations, such as limitations on filing patent applications associated with material from the open source, the inability to sue the open source developer or distributor if it does not meet expectations, or the like.

Once the requirements associated with using an open source are known, a user may decide whether it is acceptable for him or her to comply with the requirements, take the risks, and use the open source.

However, situations exist in which it is unknown whether a program was developed using open source or not. Such situations may occur, for example, when a programming project is outsourced to an external entity, when a programmer left the company and did not update his colleagues, in large companies possibly employing program development teams at multiple sites, or the like.

Another type of situations is when a user obtains an executable and does not know whether open source was used in development of the executable. This is particularly true when the executable is an ANDROID Application Package (APK) executed by a mobile device running the ANDROID operating system.

BRIEF SUMMARY

One exemplary embodiment of the disclosed subject matter is a computer-implemented method comprising: obtaining an open source class and archive database; receiving an ANDROID Application Package (APK); retrieving one or more classes comprised in the APK; matching each of the classes against the open source class and archive database, to obtain a corresponding archive collection, such that each archive in the archive collection comprises one or more of the classes; and reporting the respective archive collection. The method may further comprise determining a reduced archive collection. Within the method, determining the reduced archive collection optionally comprises clustering the corresponding archive collection in respect of the classes. The method can further comprise identifying two or more archives being revisions of one another and removing one or more of the archives.

Another exemplary embodiment of the disclosed subject matter is a computerized apparatus having a processor, the processor being adapted to perform the steps of: obtaining an open source class and archive database; receiving an ANDROID Application Package (APK); retrieving by the processor one or more classes comprised in the APK; matching by the processor each of the classed against the open source class and archive database, to obtain a corresponding archive collection, such that each archive in the archive collection comprises one or more of the classes; and reporting the respective archive collection. Within the apparatus, the processor is optionally further configured to determine a reduced archive collection. Within the apparatus, determining the reduced archive collection optionally comprises clustering the corresponding archive collection in respect of the classes. Within the apparatus, the processor is optionally further configured to identify two or more archives being revisions of one another and removing one or more of the archives.

Yet another exemplary embodiment of the disclosed subject matter is a computer program product comprising a computer readable storage medium retaining program instructions, which program instructions when read by a processor, cause the processor to perform a method comprising: obtaining an open source class and archive database; receiving an ANDROID Application Package (APK); retrieving one or more classes comprised in the APK; matching each of the classes against the open source class and archive database, to obtain a corresponding archive collection, such that each archive in the archive collection comprises one or more of the classes; and reporting the respective archive collection.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 1 shows a schematic illustration of the entities and processes involved in developing an APK and in retrieving the open source archives used in an APK, in accordance with some exemplary embodiments of the subject matter;

DETAILED DESCRIPTION

Figure 2A:
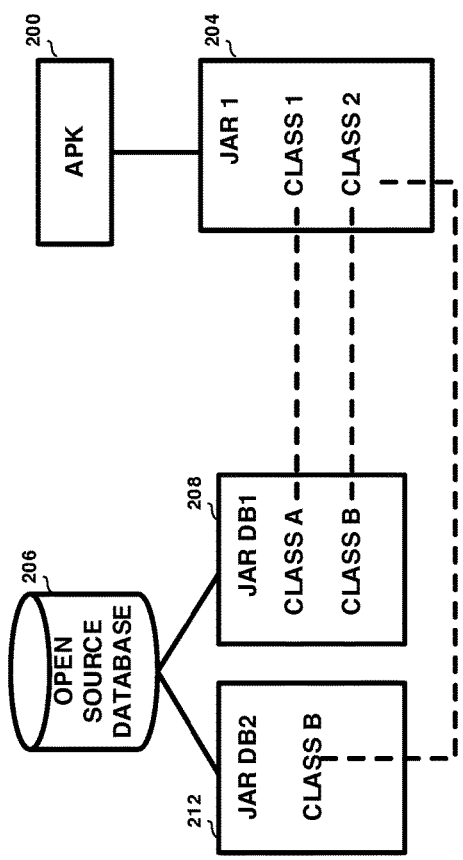
FIGS. 2A and 2B shows a schematic illustration of matching classes used in an APK with open source classes and archives, in accordance with some exemplary embodiments of the subject matter.

One technical problem dealt with by the disclosed subject matter is the need to detect whether an ANDROID Application Package (APK) comprises components from an open source library, wherein the code for the APK is unavailable. Such situation may occur when purchasing, downloading or otherwise obtaining an APK.

Another technical problem dealt with by the disclosed subject matter is the need to identify compliance requirements or security vulnerabilities posed by using an application, which may stem from the usage of open source components by the application.

One technical solution comprises a method and system for discovering open source components used in an APK, without having the source for the APK. APK poses a particular challenge relatively to executables used on other platforms, because due to the limited resources available on a mobile device, the archives, also referred to as JAVA Archives (JARs) compiled differently into the APK as compared to those compiled into an application designed for other platforms. For example, redundant JARs are removed, and redundant parts of other JARs are removed as well in order to reduce storage and memory requirements. Additionally, some of the code in the application, including the JARs is being mixed up in order to enhance security of the APK and prevent reverse engineering.

One technical solution comprises obtaining, for example by developing or receiving a database comprising references to archives, such as JAVA™ Archives (JARs). For each JAR, a list of the classes comprised therein is maintained, as well as known security vulnerabilities, bugs, revisions, or other data. It will be appreciated that the database may be indexed by JAR, by class, or the like. The information maintained for each class can include its fully qualified name, its superclass and the interfaces it implements. The information may also include any one or more of the following: imported classes, imported interfaces, fields, methods, and variables. The classes associated with each JAR, after being retrieved, may be processed back into JAR format, in order to imitate the process the classes undergo when packed as part of an APK.

When receiving an APK, the classes comprised therein are retrieved. The classes may then be compared against the classes in the database, to retrieve all JARs in the database that contain classes comprised in the APK.

The retrieved JARs may then be clustered against the list of classes in the APK which are associated with a class comprised in the database, so as to determine a minimal set of JARs that contains all said classes.

In some embodiments, retrieved JARs that are different revisions of other retrieved JARs, wherein the later revisions contain all classes of the early revisions, may be removed from the list.

The resulting JAR list may then be reported, along with details such as name, author, license, known bugs, known security vulnerabilities, or the like.

One technical effect of utilizing the disclosed subject matter is the provisioning of a method and apparatus for determining the presence of open source code in an APK, without having access to the source code of the APK.

Another technical effect of utilizing the disclosed subject matter is the reporting of the possible bugs, security vulnerabilities and requirements imposed by the usage of the open source components found in the APK.

Referring now to FIG. 1 showing a schematic illustration of the entities and processes involved in developing an APK and in retrieving the open source archives used in an APK.

Area 100 of FIG. 1 discloses the creation and the reverse engineering process of an APK, while area 101 discloses the database creation process.

An APK is an application for an ANDROID machine, such as a mobile device executing the ANDROID operating system. Process 101 may be useful in creating an application, by compiling source code into one or more JAVA classes 104. JAVA classes 104 may then be translated, for example using a Dalvik process into bytecode and stored together with archives such as one or more JAVA archives 106 in file 112, for example a file named classes.dex, comprised in a corresponding APK 108. It will be appreciated that while creating APK 108, redundant JARs 106 may be removed, and classes contained in other JARs 106 may also be removed although other classes contained in the same JARs may be used and kept. Even further, unused parts of used classes may also be left out. Thus, classes within APK classes 120 which originate from JARs 106 and retrieved from classes.dex file 112 as packed, may differ from the same JARs 106 used for creating APK 108.

When an APK is received for determining whether it contains open source, the APK classes 120 therein as contained in an APK JAR 116 may be retrieved using a utility such as DEX2JAR. The result is thus an accessible collection of APK classes 120.

On database side 122, one or more JARs 124, each associated with an open source library may be received. Each JAR 124 may undergo a class retrieval process, such as JAR2DEX, which retrieves one or more classes.dex 1 files 128, each containing information of the classes within the respective JAR 124. Each classes.dex 1 file 128 may then undergo a classes retrieval process, such as DEX2JAR similar to the process described above in association with retrieving APL classes 120 from classes.dex file 112. The result is a collection of one or more JARs 132, each corresponding to a JAR 124, containing one or more DB classes 136.

It will be appreciated that operating the JAR2DEX followed by the DEX2JAR over JAR 1 124 does not yield JAR 124 back. Rather, operating the DEX2JAR imitates the compilation of JAVA classes in order to obtain APK 108, including removing archives, classes, and parts thereof, and mixing the code. Thus JAR 132 is different from JAR 124, but its contents are comparable to the contents of APK JAR 116, and enable the searching of one or more APK classes 120 within DB classes 136 for determining open source libraries used in APK 108. It will be appreciated that even if they contain the same classes, JAR 132 and JAR 116 are different since the context of the compilation has an effect on what classes and parts thereof are incorporated into the APK.

Figure 2B:
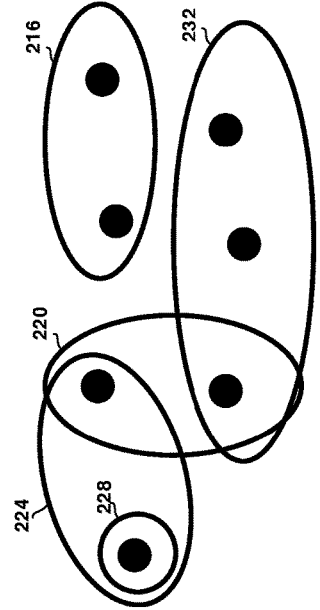

Referring now to FIGS. 2A and 2B, showing a schematic illustration of matching classes used in an APK with open source archives, in accordance with some exemplary embodiments of the subject matter.

FIG. 2A shows APK 200, from which JAR A (204) has been retrieved, JAR A (204) containing Class 1 and Class 2. It may be required to find out whether any of Class 1 or Class 2 is from an open source library.

FIG. 2A further shows open source database 206, which comprises JAR DB1 (208) and JAR DB2 (212), optionally in addition to multiple other JARS. JAR DB1 (208) contains Class A and Class B, and JAR DB2 (212) contains class B.

Class 1 may be compared against Class A and Class B, and may be associated, with high certainty with Class A. Class 2 may also be compared against Class A and Class B, and may be associated, with high certainty with Class B.

Once all classes of JAR 1 (204) that have a match with a class from open source database 206 have been matched, the situation may be depicted as in FIG. 2B, wherein each dot 228 represents a class from open source database 206 that has been associated with a class from JAR A (204), and the encompassing ellipses 216, 220, 224, 228 and 232 represent JARs from open source database 206 which contain the classes represented by the encircled dots. Finding a reduced set of JARs that contain all classes is thus equivalent to finding a reduced set of ellipses that encircles all dots. In the example of FIG. 2B, ellipses 228 and 220 can be removed, since all dots may be covered by ellipses 216, 224 and 232. This reduction may be performed using a clustering algorithm. It will be appreciated that the clustering may be made easier in a number of ways. For example, if a class is contained in one JAR only, then the class and the JAR may be removed from the clustering and added when the process ends, since the corresponding JAR will have to be added to the reduced set anyway. It will be further appreciated that the clustering may also be made easier, if when a class is contained in two JARs, wherein one of the JARs fully contains the other, then the contained JAR can be disregarded. This case is demonstrated by ellipse 228 which is fully contained in ellipse 224 and may thus be removed.

In order for the clustering to imitate a situation in classes not in the same archive are clustered together, a distance function may be defined which assigns a very high distance between classes not contained in one archive.

Once a JAR set containing all classes associated with classes from JAR 1 204 has been determined and reduced if possible, when two JARs are different revisions of the same library, the later one may be left and earlier ones removed, provided that they comprise the same classes If the containment is not full, then a range of revisions may be output. It will be appreciated, however, that in most cases in which two revisions contain the same classes, one of them may have already been eliminated in the clustering process or as a standalone step prior to that.

Figure 3:
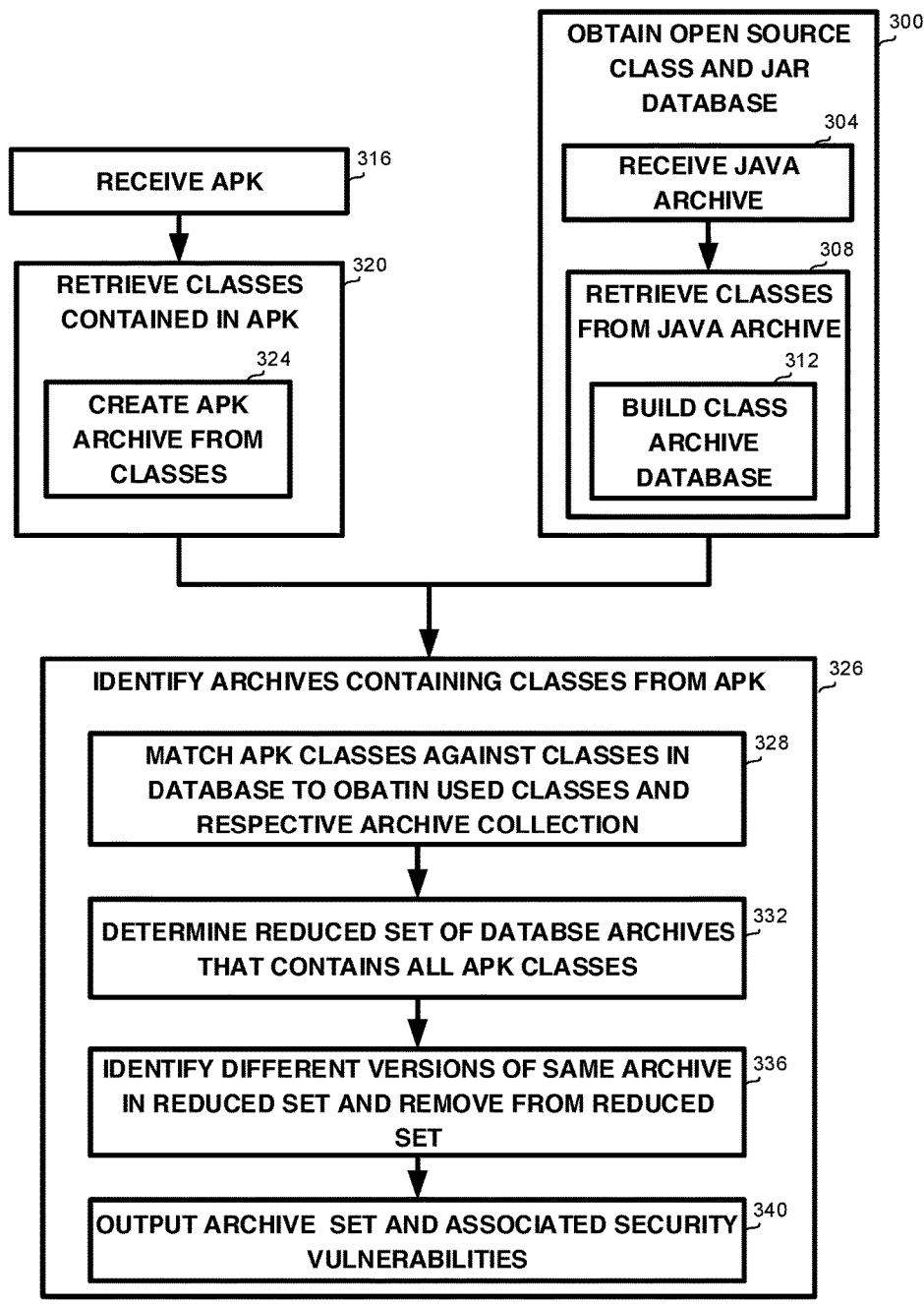
FIG. 3 shows a flowchart of steps in a method for determining open source archives used in an APK, in accordance with some exemplary embodiments of the subject matter.

Referring now to FIG. 3, showing a flowchart of steps in a method for determining open source archives used in an APK, in accordance with some exemplary embodiments of the subject matter.

The method may be performed by a system for determining open source archives used in an APK, for example system 400 and in particular processor 412 executing one or more of the modules as detailed in association with FIG. 4 below.

Step 300 discloses a method for creating a database of open source libraries which may be then used for detecting open source used in various APKs. It will be appreciated that the open source may be built once, and then updated when new libraries or new revisions of existing libraries become available.

On step 304, the system receives an open source library, such as a Java archive (JAR). Since this is an open source project, its source code is open, readable and may be manipulated by a user.

On step 308, the system retrieves the classes from the JAR, for example by using a JAR2DEX tool, to obtain a class archive, for example in the format of classes.dex file.

In some embodiments, the system may further execute a reverse process of DEX2JAR in order to obtain a JAR similar to one created when compiling an application, i.e., removing redundant classes or redundant parts of other classes.

On step 312, a database comprising all JARS may be stored, wherein each JAR may also comprise additional information such as security vulnerabilities, license, known bugs, or the like.

On step 316, an APK may be received, for which it is required to find if it uses an open source library.

On step 320, the classes contained in the APK may be retrieved. The APK may comprise a classes.dex file, from which the classes may be retrieved, by performing step 324 of creating an APK JAR comprising the APK classes, for example by executing DEX2JAR process.

Then on step 326 the system can determine whether and identify which open source archives are contained in the database.

On step 328 the system can compare the APK classes one by one, or in parallel, against the classes in the database, to obtain the used classes and the respective used archives.

Class comparison may be performed as follows: first, the fully qualified name of the two classes may be compared. If identical, the comparison may continue. Otherwise, the classes are assumed to be different and the next comparison, if any, may take place. Next, the superclasses of the relevant classes may be compared. Again, if identical, the comparison may continue. Otherwise, the classes are assumed to be different and the next comparison, if any, may take place. Then the interfaces implemented by the class may be compared. If identical, the comparison may continue. Otherwise, the classes are assumed to be different and the next comparison, if any, may take place.

If all three parameters above are identical, the classes imported into the class may be compared between the APK class and the class from the database, and similarly for the imported interfaces. The comparison results may be considered, and if both exceed a threshold, or a combination thereof exceeds a threshold, the classes may be considered the same.

All classes in the APK may thus be compared resulting in a set of database classes, each of which is assumed to be identical to an APK class, and the corresponding archives, such as JARs containing these classes.

If more than one database archive contains a class which is assumed to be the same as the APK class, then the archive containing only that class may be preferred, since there is higher probability that this is indeed the same class.

On step 332, the system can determine a reduced set of archives e.g. JARs which comprise all classes. The reduced set can be obtained by Bayesian clustering or nay other clustering, such as K-means clustering, or the like. It will be appreciated that even if a set that is not the smallest possible set is obtained, this may still be acceptable as the relevant JARs and their risks will be reported.

On step 336, the system can examine the resulting archive set for determining whether any two or more of them are different revisions of the same archive. If this is indeed the case, then if one of the archive revisions contains the other, then the contained archive may be removed from the set. If none of them contains the other, then both may remain in the set. It will be appreciated that in alternative embodiments, step 336 may be performed prior to or as part of determining the reduced set of archives on step 332.

On step 340, the system can report the determined archive set and optionally additional information. The additional information may include the determined open source archives, revision range if there are two or more revisions of the same archive, security vulnerabilities associated with any of the archives, corresponding licenses, or the like.

In some embodiments, a certainty level of the match may also be determined and reported. If a class is found in one JAR only, then there is high confidence that this JAR is correct. However, if there are a few alternatives to the source of a class, the confidence level may be lower, and the users may make their own considerations.

It will be appreciated that step 300 of creating the database can be performed separately from the steps involving a particular APK, e.g. by a different computing platform, a different environment, at an earlier time, or the like.

Figure 4:
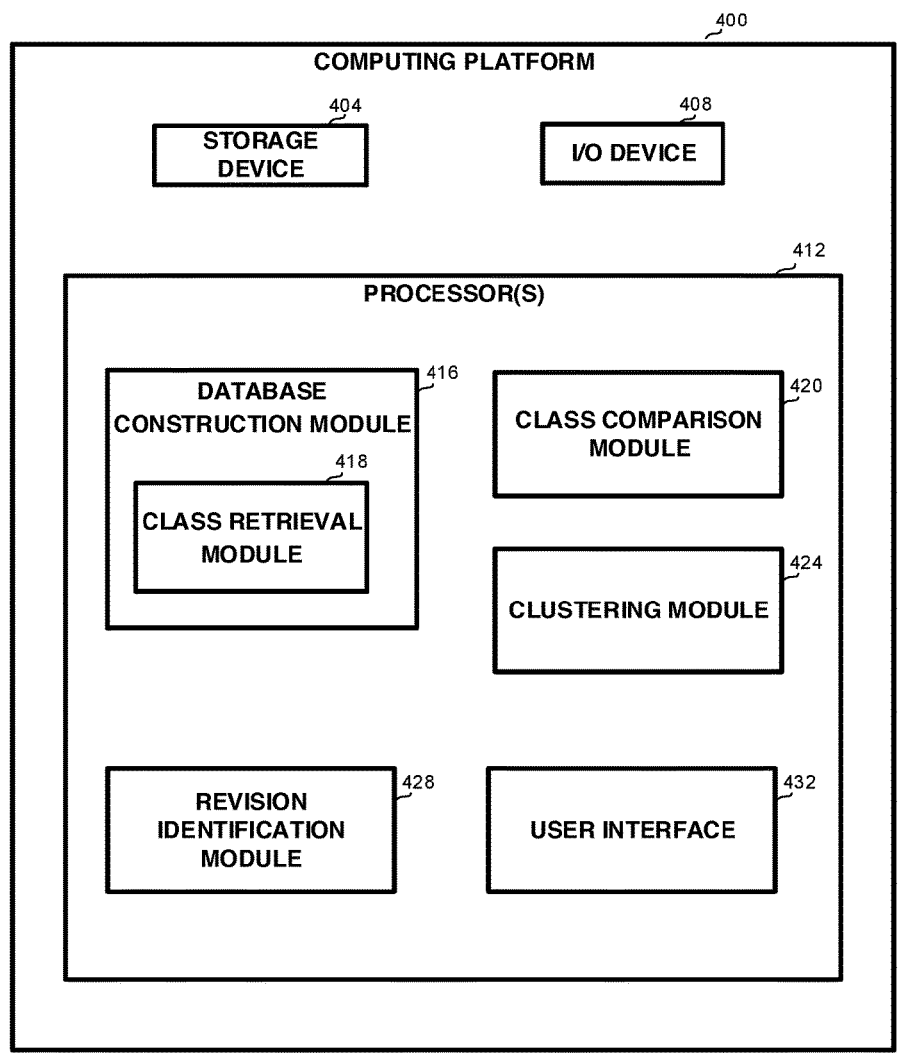
FIG. 4 shows a block diagram of a system for determining open source archives used in an APK, in accordance with some exemplary embodiments of the subject matter.

Referring now to FIG. 4 showing a block diagram of a system for determining open source archives used in an APK, in accordance with some exemplary embodiments of the subject matter. The system may comprise one or more computing platforms 400.

Computing platform 400 may comprise a storage device 404. Storage device 404 may be a hard disk drive, a Flash disk, a Random Access Memory (RAM), a memory chip, or the like. In some exemplary embodiments, storage device 404 can retain program code operative to cause processor 412 to perform acts associated with any of the subcomponents of computing platform 400.

In some exemplary embodiments of the disclosed subject matter, computing platform 400 can comprise an Input/Output (I/O) device 408 such as a display, a pointing device, a keyboard, a touch screen, or the like. I/O device 408 can be utilized to provide output to and receive input from a user.

In some exemplary embodiments of the disclosed subject matter, computing platform 400 can comprise processor 412. Processor 412 may be a Central Processing Unit (CPU), a microprocessor, an electronic circuit, an Integrated Circuit (IC) or the like. Processor 412 may be utilized to perform computations required by the apparatus or any of it subcomponents.

Processor 412 may comprise database construction module 416, which may comprise class retrieval module 418 for retrieving classes from an archive.

Processor 412 may comprise class comparison module 420 for comparing two classes. If any of the class fully qualified name, superclass or interfaces differs, then the classes are different. Otherwise, the imported classes and imported interfaces of the classes may be compared, and if similar beyond a predetermined threshold, then the classes may be determined to be the same class.

Processor 412 may comprise class clustering module 424 for clustering a collection of classes and obtaining a set of archives, such that classes belong to the same cluster if they are contained in the same archive. Clustering module 424 may be operative to reduce the archive set by eliminating archives contained in other archives.

Processor 412 may comprise revision identification module 428 for identifying archives that are revisions of one another.

Processor 412 can comprise user interface 432 for receiving input from a user such as APK to be checked, or providing output to a user such as list of archives and required additional information. User interface 432 can exchange information with a user by utilizing I/O device 408.

It is noted that the teachings of the presently disclosed subject matter are not bound by the computing platform described with reference to FIG. 4. Equivalent and/or modified functionality can be consolidated or divided in another manner and can be implemented in any appropriate combination of software with firmware and/or hardware and executed on one or more suitable devices.

The system can be a standalone entity, or integrated, fully or partly, with other entities, which can be directly connected thereto or via a network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
   obtaining an open source class and archive database;
   receiving an ANDROID Application Package (APK) comprising a multiplicity of classes and executable by a mobile device running an ANDROID operating system;
   retrieving at least one class comprised in the APK;
   matching each of the at least one class against the open source class and archive database, to obtain a corresponding archive collection, such that each archive in the archive collection comprises at least one of the at least one class;
   for at least two archives from the archive collection being revisions of one another and comprising the same classes, removing an earlier archive and maintaining a later archive of the at least two archives;
   determining a reduced archive collection, said determining comprising:
     removing from the corresponding archive collection a first archive comprising a class that is comprised only in the first archive;
     clustering the corresponding archive collection without the first archive, to obtain a reduced archive collection in respect of the at least one class; and
     adding the first archive to the reduced archive collection; and
   reporting the reduced archive collection.
2. A computerized apparatus having a processor, the processor being configured to perform the steps of:
   obtaining an open source class and archive database;
   receiving an ANDROID Application Package (APK) comprising a multiplicity of classes and executable by a mobile device running an ANDROID operating system;
   retrieving by the processor at least one class comprised in the APK;
   matching by the processor each of the at least one class against the open source class and archive database, to obtain a corresponding archive collection, such that each archive in the archive collection comprises at least one of the at least one class;
   for at least two archives from the archive collection being revisions of one another and comprising the same classes, removing an earlier archive and maintaining a later archive of the at least two archives;
   determining a reduced archive collection, said determining comprising:
     removing from the corresponding archive collection a first archive comprising a class that is comprised only in the first archive;

clustering the corresponding archive collection without the first archive, to obtain a reduced archive collection in respect of the at least one class; and adding the first archive to the reduced archive collection; and reporting the reduced archive collection.

3. A computer program product comprising a non-transitory computer readable storage medium retaining program instructions, wherein the program instructions when read by a processor, cause the processor to perform a method comprising:

obtaining an open source class and archive database;

receiving an ANDROID Application Package (APK) comprising a multiplicity of classes and executable by a mobile device running an ANDROID operating system;

retrieving at least one class comprised in the APK;

matching each of the at least one class against the open source class and archive database, to obtain a corresponding archive collection, such that each archive in the archive collection comprises at least one of the at least one class;

for at least two archives from the archive collection being revisions of one another and comprising the same classes, removing an earlier archive and maintaining a later archive of the at least two archives;

determining a reduced archive collection, said determining comprising:

removing from the corresponding archive collection a first archive comprising a class that is comprised only in the first archive;

clustering the corresponding archive collection without the first archive, to obtain a reduced archive collection in respect of the at least one class; and adding the first archive to the reduced archive collection; and reporting the reduced archive collection.

* * * * *